United States Patent [19]

Wun

[11] Patent Number: 5,497,272
[45] Date of Patent: Mar. 5, 1996

[54] LENS SWITCHING DEVICE FOR MULTI-LENS OPTICAL SCANNERS

[75] Inventor: Jeffrey Wun, Hsinchu, Taiwan

[73] Assignee: Umax Data Systems Inc., Hsinchu, Taiwan

[21] Appl. No.: 249,893

[22] Filed: May 26, 1994

[51] Int. Cl.⁶ .................... G02B 7/02; G05G 1/00
[52] U.S. Cl. .................... 359/821; 359/822; 74/469
[58] Field of Search .................... 359/821, 822, 359/823, 826, 813, 381; 74/469, 471 R, 473 R

[56] References Cited

U.S. PATENT DOCUMENTS

| | | | |
|---|---|---|---|
| 3,918,317 | 11/1975 | Claussen | 74/469 |
| 4,092,063 | 5/1978 | Koester | 359/821 |
| 4,262,989 | 4/1981 | Waters | 359/377 |
| 4,327,974 | 5/1982 | Schmidt | 359/821 |

Primary Examiner—Georgia Y. Epps
Assistant Examiner—Ricky Mack
Attorney, Agent, or Firm—W. Wayne Liauh

[57] ABSTRACT

A switching device for a multi-lens optical scanner, which comprises a body casing, a sliding lens seat and a driving mechanism; the feature of the switching device is that the power of a scanning device is used for driving a guide rod of the switching device so as to set the mechanism at a given position automatically, and provide an optical scanner with various resolving powers desired.

3 Claims, 8 Drawing Sheets

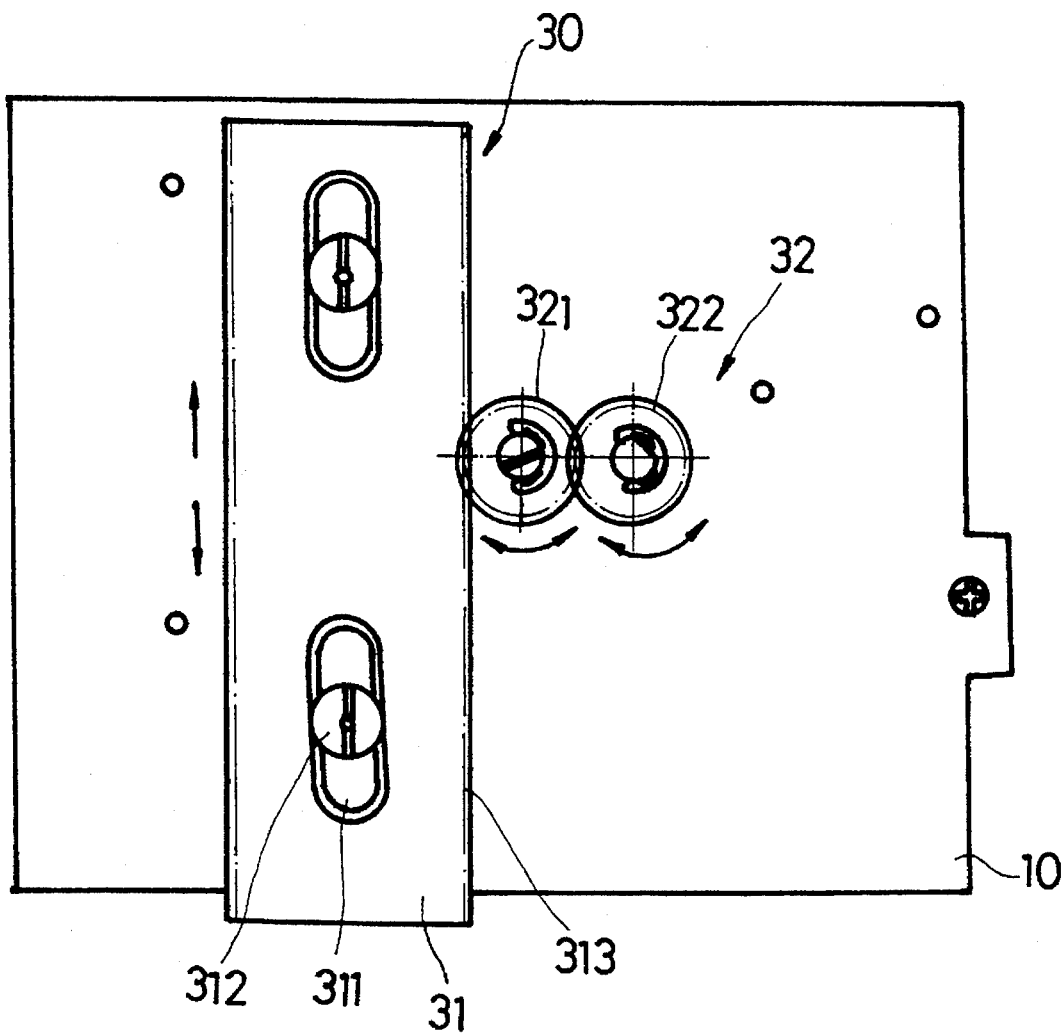
F I G . 4

LENS SWITCHING DEVICE FOR MULTI-LENS OPTICAL SCANNERS

BACKGROUND OF THE INVENTION

In the conventional optical scanner, a single lens with a specific resolving power is usually designed in accordance with a user's requirement; a scanner with a high resolving power is usually used to input drawings or characters, while a scanner with a low resolving power is used to input simple documents or papers. Theoretically, the scanner with a high resolving power would provide a better scanning quality; however it has a lower scanning speed as a result of having to scan more spots. Therefore, a user may select a scanner with faster scanning speed and with an acceptable resolving power in the same time, if possible.

Currently, the lens used within an optical scanning device is usually designed and limited to a single lens with one resolving power (as shown in FIG. 1); when a user has to scan various kinds of papers for input processing, he has to purchase two or more different scanning machines which costs more, or to tolerate the poor scanning quality or the slow scanning speed; in other words, the aforesaid conventional scanner has many inconveniences and drawbacks in the lens mechanism thereof, and an improvement therefor is required.

SUMMARY OF THE INVENTION

The prime object of the present invention is to provide a switching device for a multi-lens mechanism in an optical scanner so as to provide two or more resolving powers by means of the guide rod, which can position the lens correctly by being pushed by a given position inside the scanning device without using another dynamic force in order to reduce manufacturing cost and to save space in the event of a driving motor having to be installed; further, the present invention will provide an optical scanning device with a wider scope of resolving power, and a smaller size thereof.

The prime functions of the present invention are described as follows:

First, since the present invention can provide an optical scanning device with different resolving power by means of several lenses to be switched one to another, the use flexibility of the optical scanning device will be increased, and the cost thereof will be reduced.

Second, the present invention can have several lenses switched one to another by using the driving force of the optical scanning device without causing additional cost to provide the driving parts; further, the present invention is also compatible with the CCD circuit of the common scanning device, i.e., without requiring considerable modification on the conventional optical scanning device.

BRIEF DESCRIPTION OF THE DRAWINGS

FIG. 4 is a bottom view of the embodiment according to the present invention.

DETAILED DESCRIPTION

Figure 1:
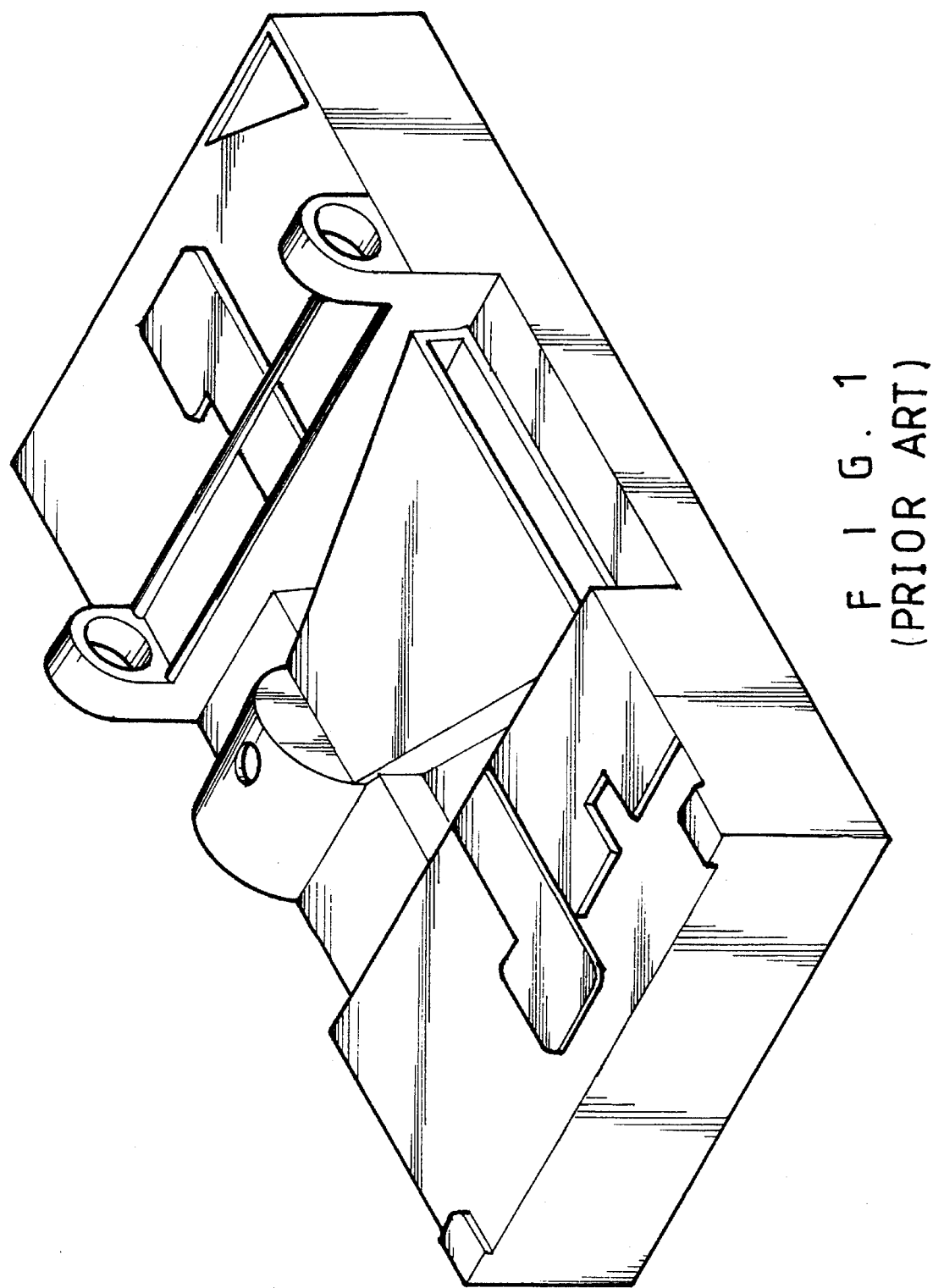
FIG. 1 is a perspective view of the lens assembly in a conventional optical scanning device.
Figure 2:
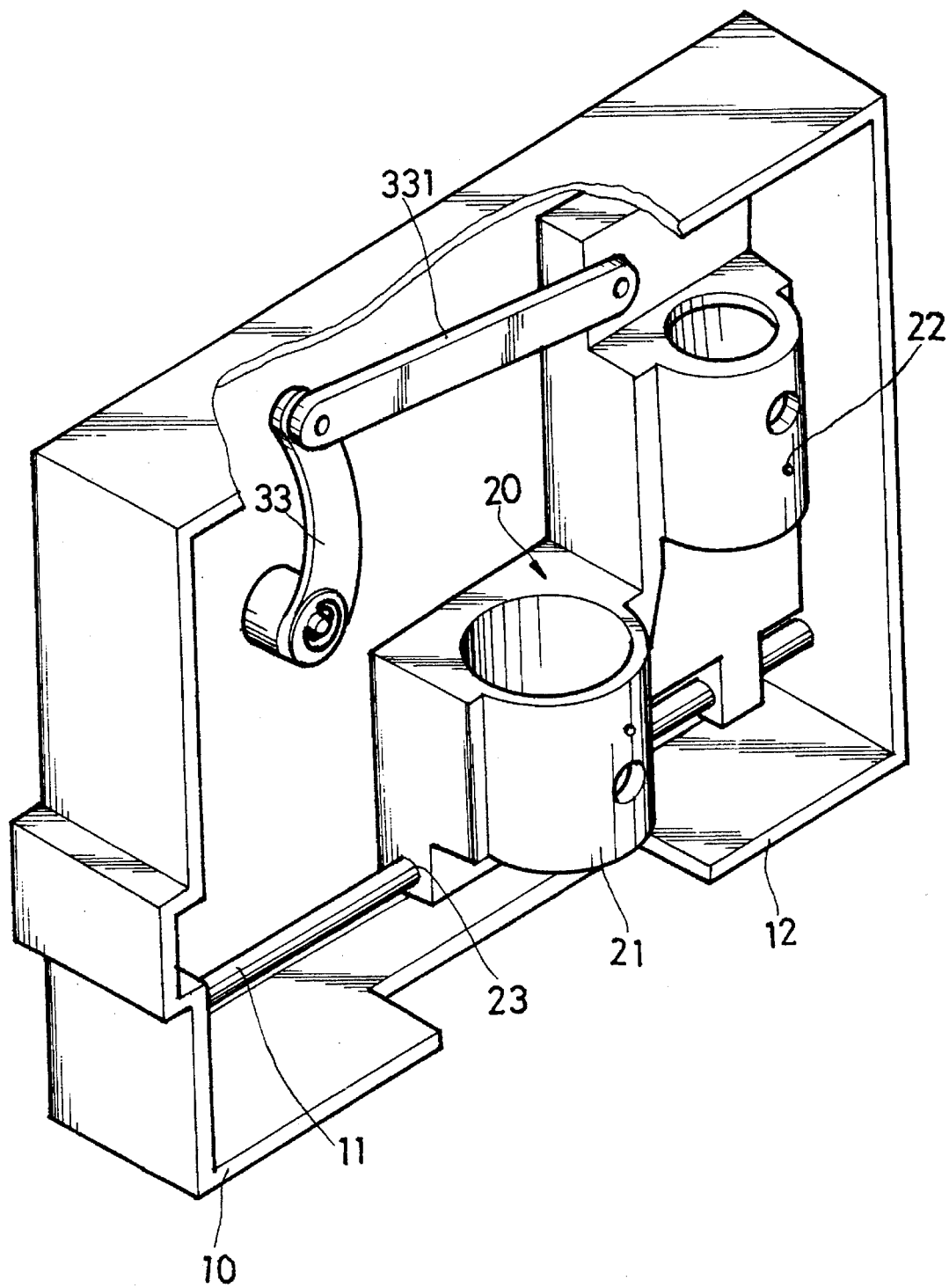
FIG. 2 is a perspective view of an embodiment according to the present invention.
Figure 3:
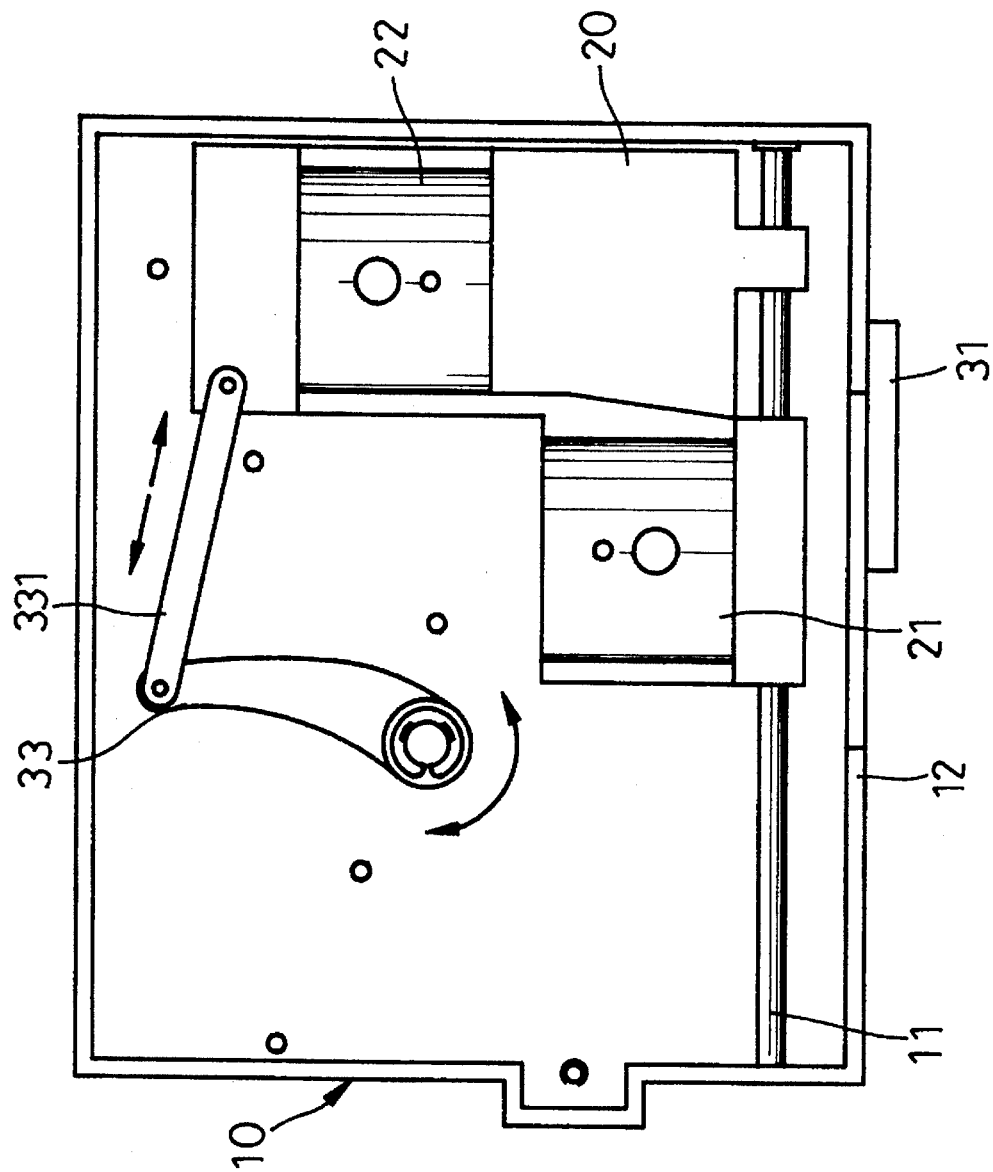
FIG. 3 is a top view of the embodiment according to the present invention.
Figure 5:
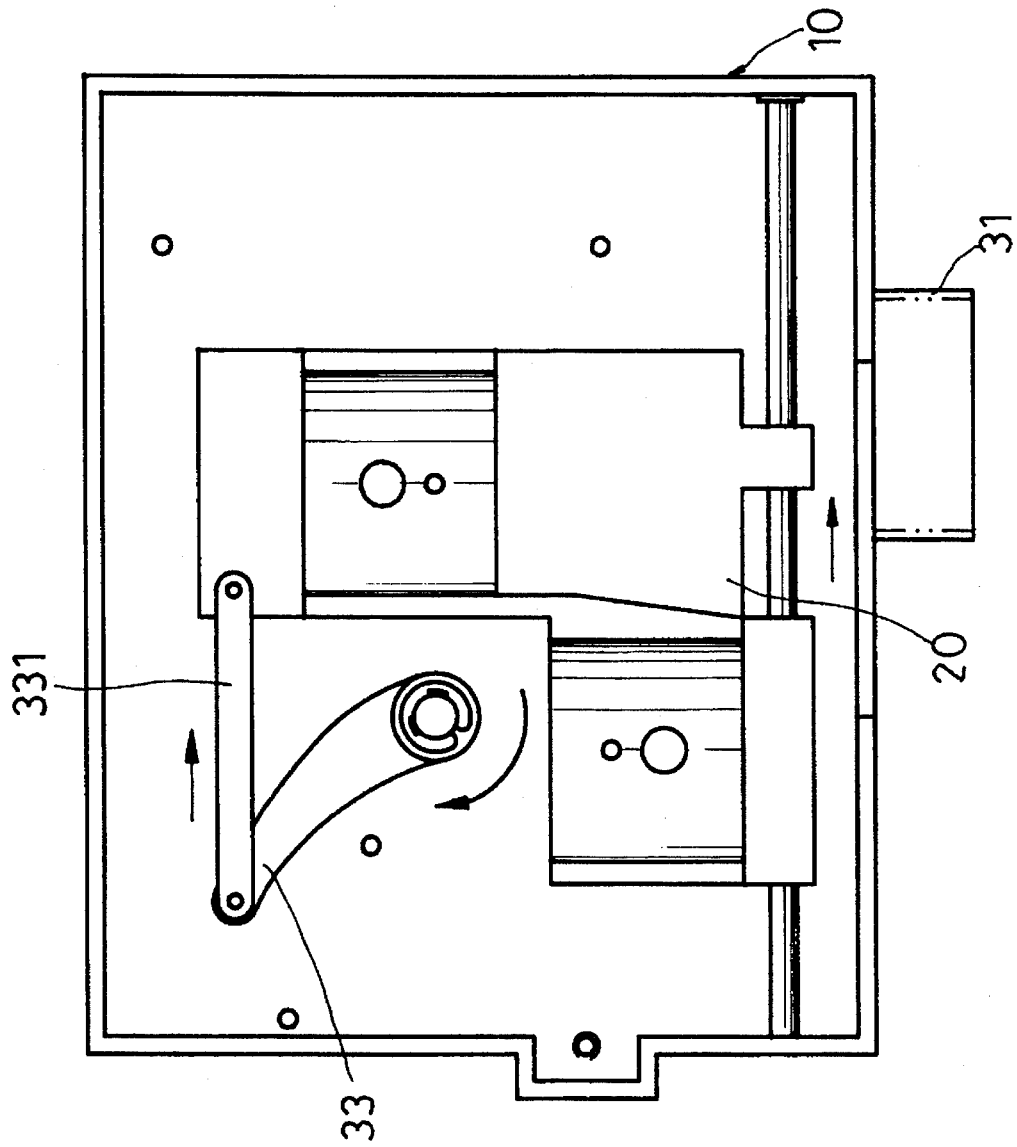
FIG. 5 is a top view of the embodiment upon a lens being switched.

Referring to FIGS. 2, 3 and 4, the present invention is comprised of a body casing 10, a sliding lens seat 20, and a driving mechanism 30; the body casing 10 is substantially a square box, which includes a sliding rail 11 and an aperture 12 as a light channel to CCD circuit. The sliding lens seat 20 is used for mounting a first lens 21 and a second lens together; the bottom of the seat 20 has a round hole 23 for receiving the sliding rail 11. The sliding lens seat 20 can move along the sliding rail 11 upon being driven with the driving mechanism 30. The driving mechanism 30 includes a guide rod 31, a gear train 32 and a transmission rod 33; the guide rod 31 is installed at the bottom of the body casing 10. The guide rod 31 is provided with two sliding slots 311, of which each has a positioning screw 312 for fastening the guide rod 31 to the body casing 10 in a straight movable manner. One side of the guide rod 31 is furnished with teeth 313 to be engaged with a first gear 321 of the gear train 32, i.e., to drive the first gear 321 to rotate; since the first gear 321 is engaged with a second gear 322, which is then coupled with the transmission rod 33 in the body casing 10. The front end of the transmission rod 33 is coupled with a sub-transmission rod 331 which is coupled with the sliding lens seat 20. When the second gear 322 is turned, the transmission rod 33 will drive the sliding lens seat 20 to move; in other words, the transmission theory (as shown in FIG. 5) of the driving mechanism 30 is that the perpendicular movement of the guide rod 31 at the bottom of the body casing 10 is converted into a horizontal movement of the sliding lens seat 20 in the body casing 10.

Figure 6:
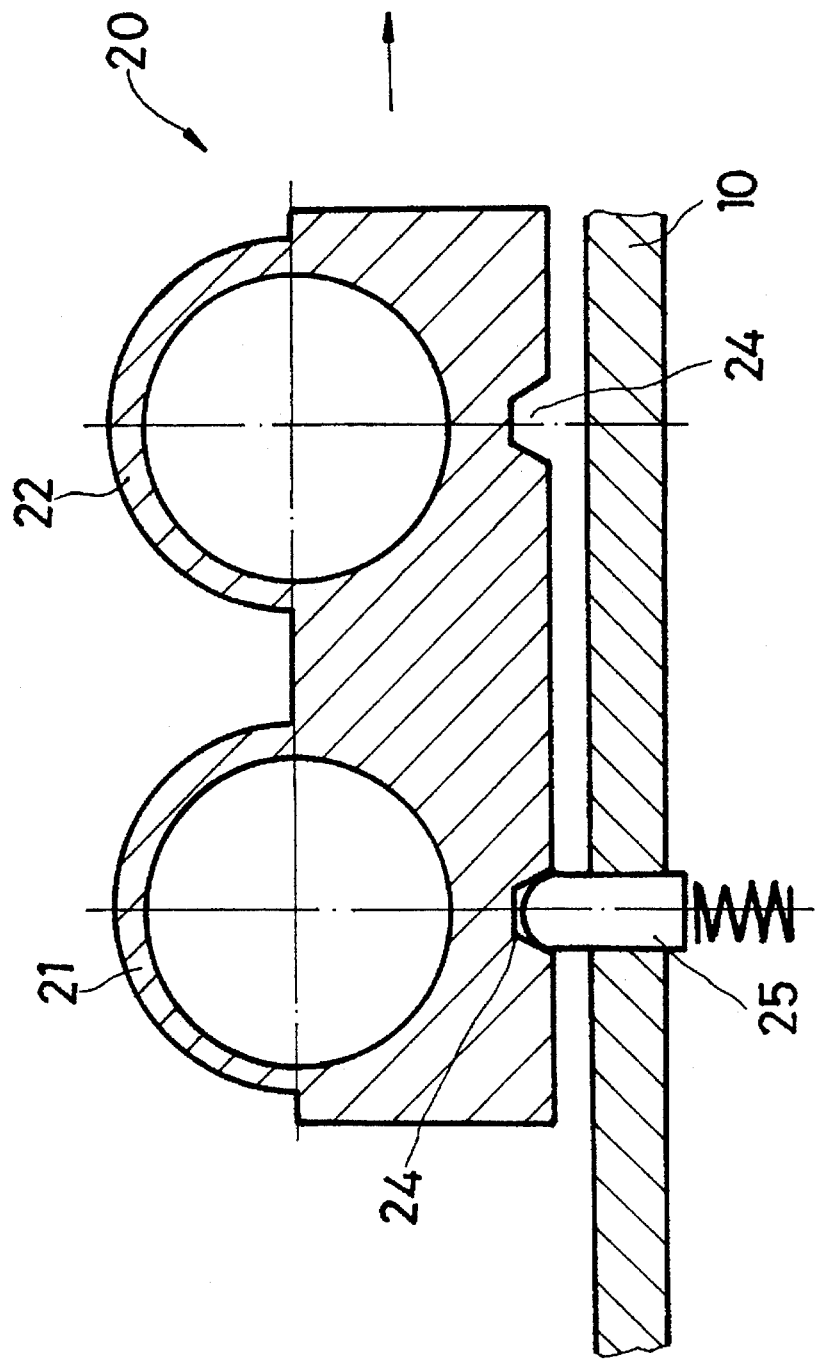
FIG. 6 is a fragmental section view of the embodiment, showing the positioning method of a sliding lens seat according to the present invention.

In order to have a better positioning condition upon switching the lens, the bottom of the body casing 10 is furnished with a positioning pin 25 (as shown in FIG. 6); the bottoms of the first and second lenses 21 and 22 in the sliding lens seat 20 are provided with two positioning holes 24 respectively. The lens switching can be positioned correctly by means of the positioning pin 25 and the positioning holes 24 while the sliding lens seat 20 is moved within the body casing 10.

Figure 7:
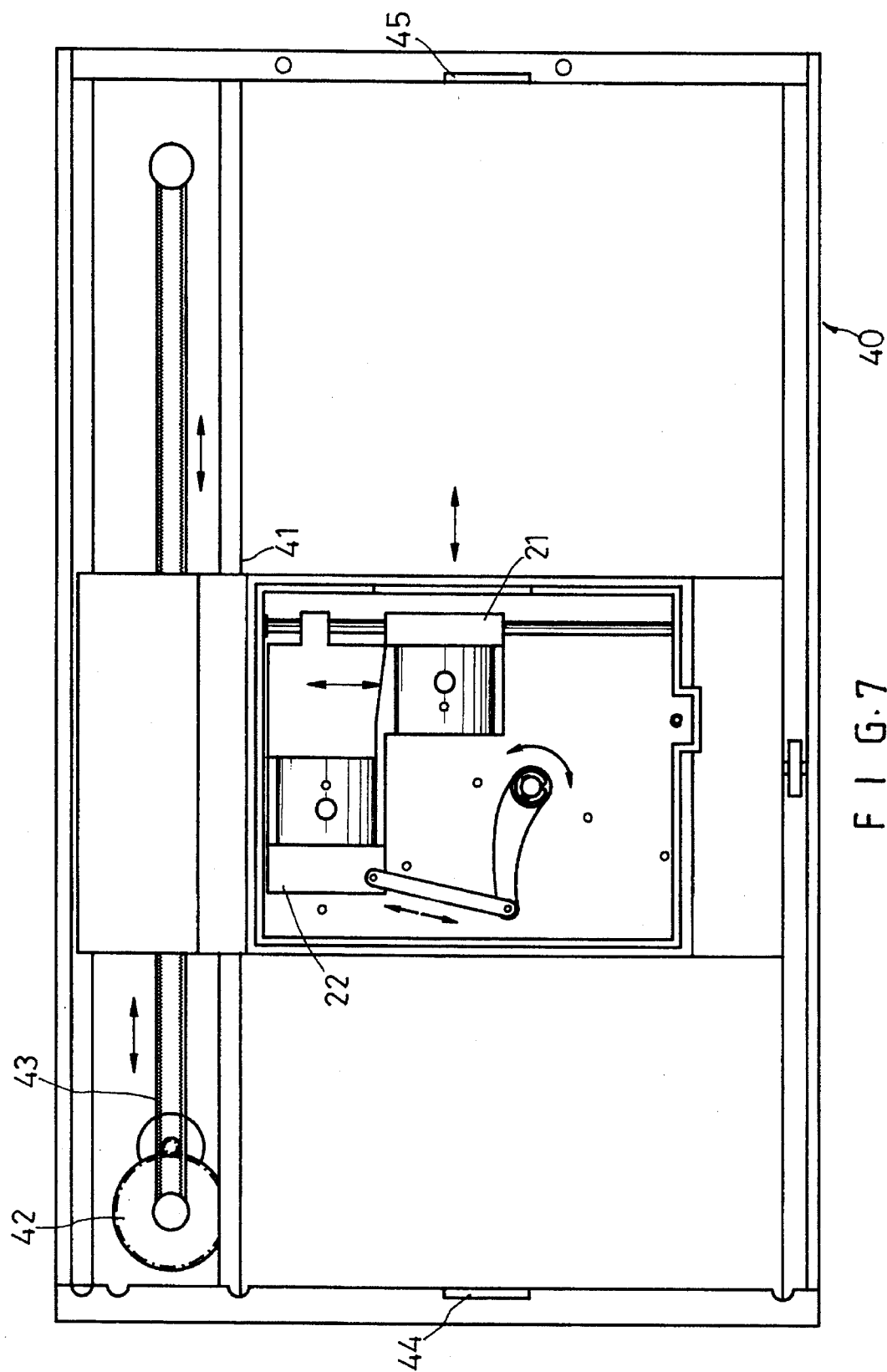
FIG. 7 is a top view of an optical scanning device mounted with the present invention therein.

When the present invention is used in an optical scanning device, it is usually mounted on a scanning plate 41 (as shown in FIG. 7). Usually, the first lens 21 is used for a first resolving power; when a second resolving power is required, the second lens 22 can be moved in place by means of a scanner driving program, which will control the driving motor 42, and the transmission belt 43 to have the present invention on the scanning plate 41 moved to a front-switching position 44 in front of the frame portion 40, and then the guide rod 31 will move backwards to cause the second lens 22 to be set in place; likewise, when the first resolving power needs to be used again, a user may set the present invention to the rear-switching position 45, and the guide rod 31 will be pushed forward to have the first lens 21 returned to operation position.

Figure 8:
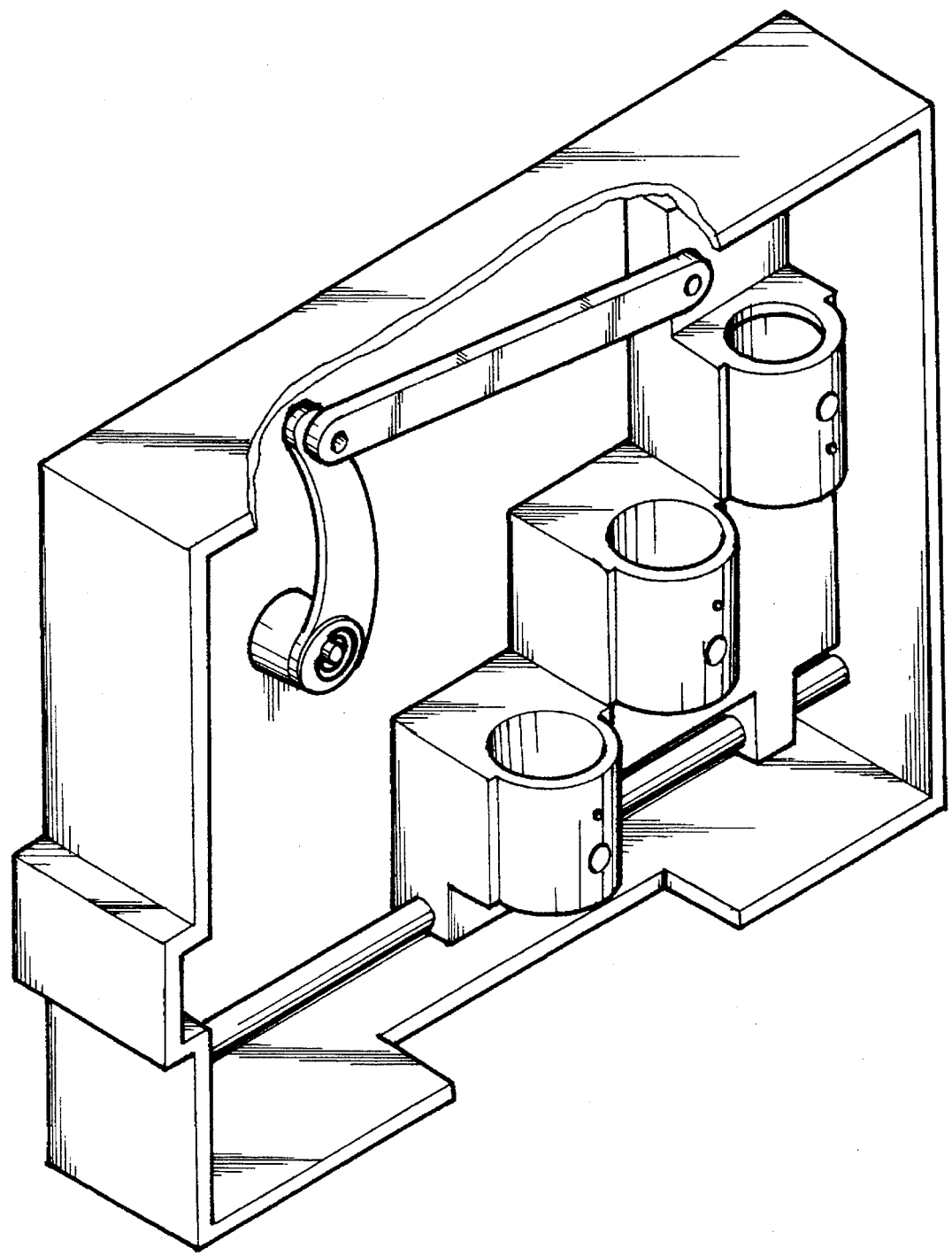
FIG. 8 is a perspective view of another embodiment according to the present invention.

The aforesaid description is for an embodiment having two lenses to be switched. If three or more lenses are required, the body casing 10 and the sliding lens seat 20 have to be modified properly (as shown in FIG. 8). When a lens is to be switched according to the present invention, the scanning device will have the present invention moved to a given position no matter if the switching being done is in front or rear of the scanning device; in other words, any modification or improvement for such function made by a person skilled in the art would be deemed within the scope and spirit of the claims according to the present invention.

I claim:

1. A lens switching device for a multi-lens optical scanner, comprising:

a driving motor and a transmission belt connected to said driving motor to receive power therefrom;

a body casing including a sliding rail, a sliding lens seat, and an aperture, said body casing being able to move in a first direction by said transmission belt;

said sliding lens seat including a plurality of lenses, and a bottom of said sliding lens seat having a round hole for receiving said sliding rail so as to allow said sliding lens seat to freely slide along said sliding rail within said body casting in a second direction perpendicular to said first direction;

a driving mechanism for receiving power from said body casing so as to move said sliding lens seat in said second direction and synchronously with a movement of said body casing;

said driving mechanism including a guide rod, a gear train, a transmission rod pivotably connected to said gear train, and a sub-transmission rod pivotably connected to said transmission rod; said sub-transmission rod being connected to said sliding lens seat so as to enable said sliding lens seat to move in said second direction along said sliding rail upon a rotation of said gear train;

wherein said guide rod is affixed to said body casing in such a manner so as to allow said body casing to move in said first direction, said gear train is affixed to said body casing so as to move therewith, and said guide rod is provided with a plurality of teeth engaged with said gear train so as to drive said gear train and cause said transmission rod and said sub-transmission rod to pivot;

whereby when a user selects a lens from said plurality of lenses, said driving motor will be actuated so as to move said body casing in said first direction to move said body casing containing said sliding lens seat toward a first predetermined position, the movement of said body casing also causes said gear train to rotate via an engagement between said gear train and said guide rod, said rotation of said gear train causes said transmission rod and said sub-transmission rod to pivot said selected lens to move, thus causing said sliding lens seat to move synchronously in said second direction toward a second predetermined position.

2. A lens switching device for a multi-lens optical scanner as claimed in claim 1 wherein said gear train includes a first gear and a second gear.

3. A lens switching device for a multi-lens optical scanner as claimed in claim 1 wherein said body casting is further provided with a positioning pin bottom thereof; and bottom surface of each said lens in said sliding lens seat being furnished with a positioning hole to be matched with said positioning pin.

* * * * *